(12) United States Patent
Ide (10) Patent No.: US 9,286,208 B2
(45) Date of Patent: *Mar. 15, 2016

(54) CONTROLLER CONTROLLING AN INTERLEAVE OPERATION, SOLID-STATE DRIVE INCLUDING THE CONTROLLER, AND CONTROL METHOD CONTROLLING AN INTERLEAVE OPERATION (71) Applicant: KABUSHIKI KAISHA TOSHIBA, Minato-ku (JP)

(72) Inventor: Takashi Ide, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 71 days.

This patent is subject to a terminal disclaimer.

(21) Appl. No.: 14/200,455

(22) Filed: Mar. 7, 2014

(65) Prior Publication Data

US 2015/0227458 A1 Aug. 13, 2015

Related U.S. Application Data (60) Provisional application No. 61/937,140, filed on Feb. 7, 2014.

(51) Int. Cl.
G06F 13/00 (2006.01)
G06F 12/02 (2006.01)

(52) U.S. Cl.
CPC .... *G06F 12/0246* (2013.01); *G06F 2212/1041* (2013.01); *G06F 2212/202* (2013.01)

(58) Field of Classification Search
CPC . G06F 3/0653; G06F 3/0659; G06F 12/0246; G06F 12/0607
USPC .............. 711/102, 150, 157, 168; 710/20, 36; 712/225, 245
See application file for complete search history.

(56) References Cited

U.S. PATENT DOCUMENTS

| | | | |
|---|---|---|---|
| 2007/0294470 A1* | 12/2007 | Van Dyke | G06F 13/161 711/104 |
| 2011/0047437 A1* | 2/2011 | Flynn | G06F 9/52 714/758 |
| 2011/0058440 A1* | 3/2011 | Smith | G11C 5/141 365/229 |
| 2012/0023348 A1 | 1/2012 | Byom et al. | |
| 2012/0144144 A1 | 6/2012 | Worthington et al. | |
| 2012/0210095 A1* | 8/2012 | Nellans | G06F 12/1072 711/206 |
| 2012/0239873 A1* | 9/2012 | Huang et al. | 711/105 |
| 2012/0265949 A1 | 10/2012 | Shimizu | |
| 2012/0324311 A1* | 12/2012 | Flynn | G06F 1/183 714/758 |
| 2014/0059286 A1* | 2/2014 | Matsuo | G06F 13/1647 711/105 |

* cited by examiner

Primary Examiner — Reba I Elmore
(74) Attorney, Agent, or Firm — Oblon, McClelland, Maier & Neustadt, L.L.P.

(57) ABSTRACT

According to one embodiment, a controller includes a first command queuing part corresponding to a first bank, the first command queuing part queuing a first command, a second command queuing part corresponding to a second bank, the second command queuing part queuing a second command, and a command execution control part which is configured to generate a first sub-command sequence based on a group of commands in the first command, generate a second sub-command sequence based on a group of commands in the second command, and determine whether or not to execute the first and second sub-command sequences in parallel as an interleave operation between the first and second banks, by comparing an additional value of a first numeric converted parameter of the first sub-command sequence and a second numeric converted parameter of the second sub-command sequence with a threshold data.

20 Claims, 10 Drawing Sheets

| Sub-command sequence | Numeric conversion |
|---|---|
| SCS-A | NA |
| SCS-B | NB |
| SCS-C | NC |
| SCS-D | ND |
| SCS-E | NE |
| SCS-F | NF |
| SCS-G | NG |
| SCS-H | NH |
| SCS-I | NI |

| Sub-command sequence | | Numeric conversion |
|---|---|---|
| SCS-A | Mode-A | NAA |
| | Mode-B | NAB |
| SCS-B | Mode-A | NBA |
| | Mode-B | NBB |
| SCS-C | Mode-A | NCA |
| | Mode-B | NCB |
| SCS-D | Mode-A | NDA |
| | Mode-B | NDB |
| SCS-E | Mode-A | NEA |
| | Mode-B | NEB |
| SCS-F | Mode-A | NFA |
| | Mode-B | NFB |
| SCS-G | Mode-A | NGA |
| | Mode-B | NGB |
| SCS-H | Mode-A | NHA |
| | Mode-B | NHB |
| SCS-I | Mode-A | NIA |
| | Mode-B | NIB |

CONTROLLER CONTROLLING AN INTERLEAVE OPERATION, SOLID-STATE DRIVE INCLUDING THE CONTROLLER, AND CONTROL METHOD CONTROLLING AN INTERLEAVE OPERATION

CROSS-REFERENCE TO RELATED APPLICATIONS

This application claims the benefit of U.S. Provisional Application No. 61/937,140, filed Feb. 7, 2014, the entire contents of which are incorporated herein by reference.

FIELD

Embodiments described herein relate generally to a controller, a solid-state drive (SSD) and a control method.

BACKGROUND

In a memory system comprising a plurality of banks serving as data storage devices and a controller which controls operations on the plurality of banks, such as data reading, writing and erasing, an interleave operation is an effective technique for improving a throughput. The interleave operation is an operation in which the banks are operated in parallel.

On the other hand, it is necessary to satisfy conditions such as peak current and temperature, which are necessary as a specification of a memory system during an operation thereof, including an interleave operation.

DETAILED DESCRIPTION

In general, according to one embodiment, a controller comprises: a first command queuing part corresponding to a first bank, the first command queuing part queuing a first command, the first bank executing the first command queued in the first command queuing part; a second command queuing part corresponding to a second bank, the second command queuing part queuing a second command, the second bank executing the second command queued in the second command queuing part; and a command execution control part which is configured to: generate a first sub-command sequence based on a group of commands in the first command queued in the first command queuing part, generate a second sub-command sequence based on a group of commands in the second command queued in the second command queuing part, and determine whether or not to execute the first and second sub-command sequences in parallel as an interleave operation between the first and second banks, by comparing an additional value of a first numeric converted parameter of the first sub-command sequence and a second numeric converted parameter of the second sub-command sequence with a threshold data.

Block Configuration

Figure 1:
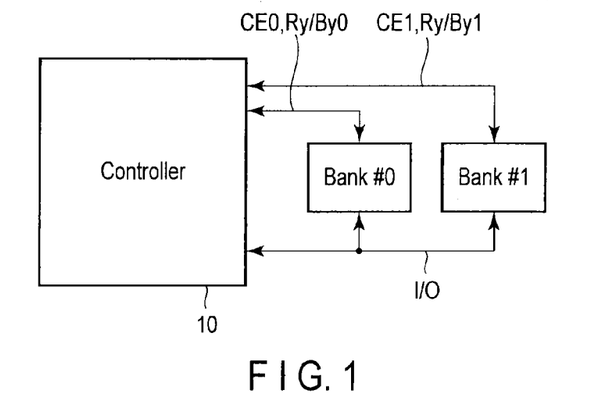
FIG. 1 is a block diagram of a memory system.

FIG. 1 is a block diagram of a memory system.

Banks #0 and #1 are data storage devices, e.g., NAND flash memories. In an example shown in the figure, the number of banks is two; however, it is not limited to two. That is, it suffices that the number of banks is two or more.

Controller 10 controls operations of banks #0 and #1.

For example, chip enable signals CE0 and CE1 for switching banks #0 and #1 are transferred from controller 10 to banks #0 and #1 through dedicated buses, respectively.

On the other hand, ready/busy signals Ry/By0 and Ry/By1 indicating states of banks #0 and #1 are transferred from banks #0 and #1 to controller 10 through the dedicated buses, respectively.

I/O denotes data to be transferred through a common bus which is provided in common for Banks #0 and #1.

To be more specific, control signals such as a command latch enable (CLE) and address latch enable (ALE) are transferred from controller 10 to Banks #0 and #1 through common bus CB. It should be noted that those control signals are not shown; that is, their figures are omitted. Also, commands to operate banks #0 and #1 are also transferred from controller 10 to banks #0 and #1 through common bus CB. The commands include a read command, a write command, an erase command, etc.

Since a command is transferred through common bus CB, until transfer of a command is completed, another command cannot be transferred.

For example, while a command is being transferred from controller 10 to bank #0, common bus CB is used, and thus another command cannot be transferred from controller 10 to bank #1.

It should be noted that a time period in which a read, write or erase operation is performed in a bank given a command is referred to as busy time. The busy time continues for a given time period even after transfer of a command is completed.

In such a memory system, the throughput is improved by performing, e.g., an interleave operation in which a plurality of banks are operated in parallel with each other.

Embodiments as described later provides a technique which in a mode in which a plurality of banks are operated in parallel with each other, it is checked in real time whether conditions such as peak current and temperature are satisfied as a specification of a memory system or not, to thereby avoid addition of redundant constraints of, e.g., operating the plurality of banks only for predetermined specific processing, and setting a ceiling on the number of banks to be operated in parallel with each other.

For example, parameters such as temperature and peak current generated by executing a command or one or more sub-commands in a command are subjected to numeric conversion. Thereby, parameters such as temperature and peak current generated by executing commands or sub-commands in a plurality of banks in parallel with each other are added and grasped as numeric data.

In this case, parameters such as temperature and peak current of the entire memory system can be accurately checked in real time and each time a command or a sub-command is executed; and as a constraint, it is simply determined whether the numeric data is smaller than threshold data (upper limit) or not. Therefore, when a plurality of banks are operated in parallel with each other as in an interleave operation, only a required minimum constraint is applied, as a result of which the performance of the memory system can be improved.

Controller

Figure 2:
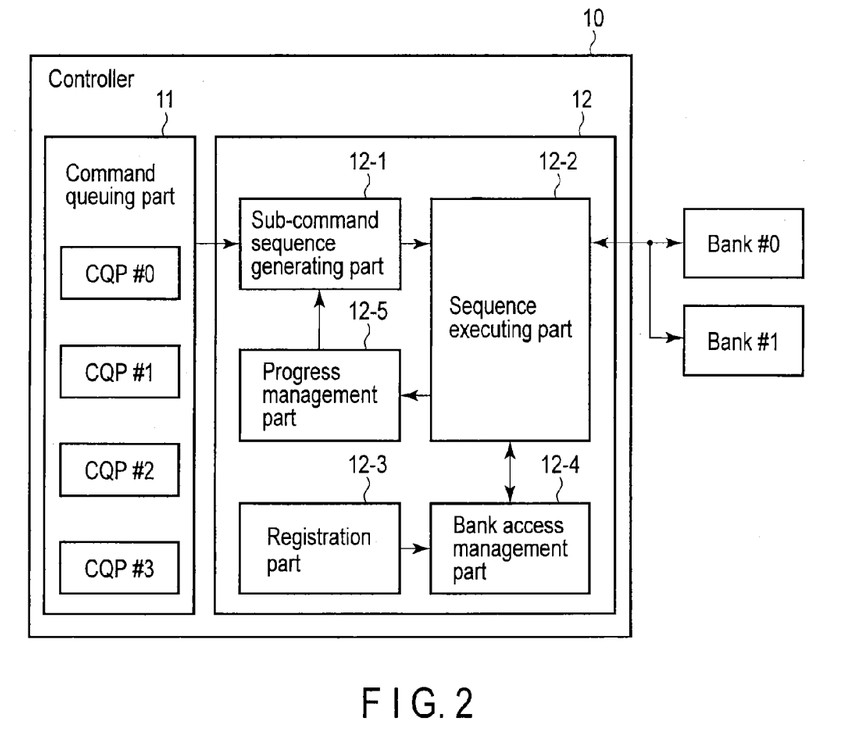
FIG. 2 is a view showing a controller as shown in FIG. 1.

FIG. 2 shows a controller as shown in FIG. 1.

To be more specific, controller 10 comprises command queuing part 11 and command execution control part 12.

Command queuing part 11 is provided in association with banks to be controlled by controller 10. For example, as shown in FIG. 2, in the case where controller 10 controls operations of banks #0 and #1, command queuing part 11 comprises CQP #0 and CQP #1.

CQP #0 queues a plurality of commands to be executed in bank #0, and CQP #1 queues a plurality of commands to be executed in bank #1.

Command execution control part 12 controls timing of instructing bank #0 or bank #1 to execute a command or a sub-command or controls whether or not to instruct bank #0 or bank #1 to execute a command or a sub-command, for example, based on parameters such as peak current and temperature, which are subjected to numeric conversion for each of commands or one or more sub-commands in each command.

In order to achieve the above, command execution control part 12 comprises, e.g., sub-command sequence generating part 12-1, sequence executing part 12-2, registration part 12-3, bank access management part 12-4, and progress management part 12-4.

Sub-command sequence generating part 12-1 converts a command sequence queued in command queuing part 11, i.e., queued in CQP #0 and CQP #1, to one or more sub-command sequences.

It should be noted that the command sequence means a sequence of sub-commands forming a single command. The sub-command sequence is a sequence of at least two of a plurality of sub-commands in a single command, said at least two sub-commands being successively transferred to a data storage device. Therefore, a single command sequence is provided as a single sub-command sequence or as a plurality of sub-command sequences.

However, suppose a sub-command includes a primitive command or commands. The primitive command is a command which is given solely to cause a data storage device to perform a meaningful operation, or the primitive commands are commands which are given in combination to cause a data storage device to perform a meaningful operation.

An example of the sub-command sequence will be explained.

Figure 3:
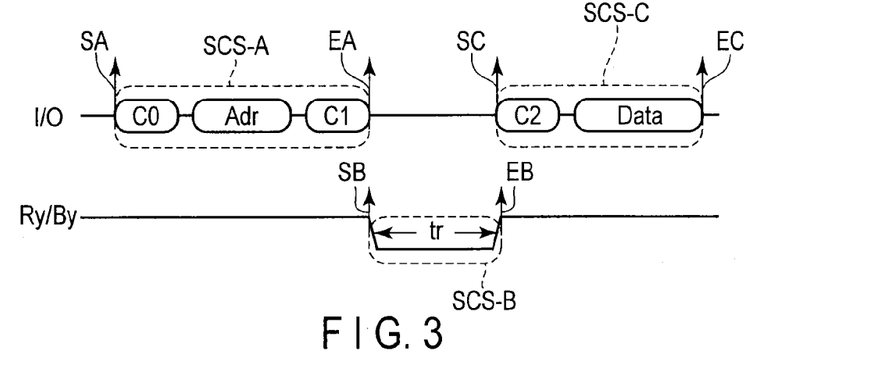
FIGS. 3-5 are views showing an example of a sub-command sequence.

FIG. 3 shows an example of the read command.

The read command comprises a sequence of commands C0, Adr, C1, C2 and Data. This sequence is transferred between the controller and each of the banks through I/O. However, it should be noted that C0, C1 and C2 correspond to primitive commands as described above.

For example, an operation of a bank is determined by C0, C1 and C2. Adr corresponds to an address phase in which an address to be referred to in an access to a NAND flash memory is transferred. Also, Data corresponds to a phase in which data is read out from the NAND flash memory.

In this example, a read command sequence is divided into three sub-command sequences SCS-A, SCS-B and SCS-C.

Sub-command sequence SCS-A comprises C0, Adr and C1. Sub-command sequence SCS-B corresponds to busy time tr in which a read operation is performed in the bank. Sub-command sequence SCS-C comprises C2 and Data.

Figure 4:
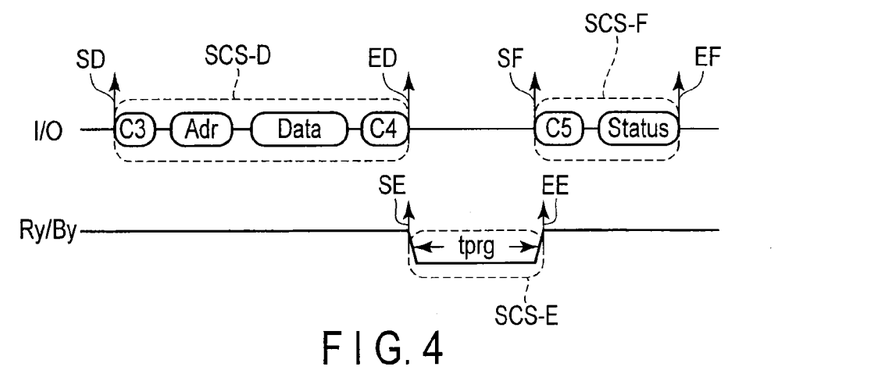

FIG. 4 shows an example of the write command.

The write command comprises a sequence of commands C3, Adr, Data, C4, C5 and Status. This sequence is transferred between the controller and each of the banks through I/O. However, it should be noted that C3, C4 and C5 correspond to primitive commands as described above.

For example, an operation of a bank is determined by C3, C4 and C5. Adr corresponds to an address phase in which an address to be referred to in a write operation is transferred to the bank. Data corresponds to a data phase in which write data is transferred to the bank, and Status corresponds to a status phase in which a status indicating success/failure of writing is transferred to the controller.

In this example, a write command sequence is divided into three sub-command sequences SCS-D, SCS-E and SCS-F.

Sub-command sequence SCS-D comprises C3, Adr, Data and C4. Sub-command sequence SCS-E corresponds to busy time tprg in which a write operation is performed in the bank. Sub-command sequence SCS-F comprises C5 and Status.

Figure 5:
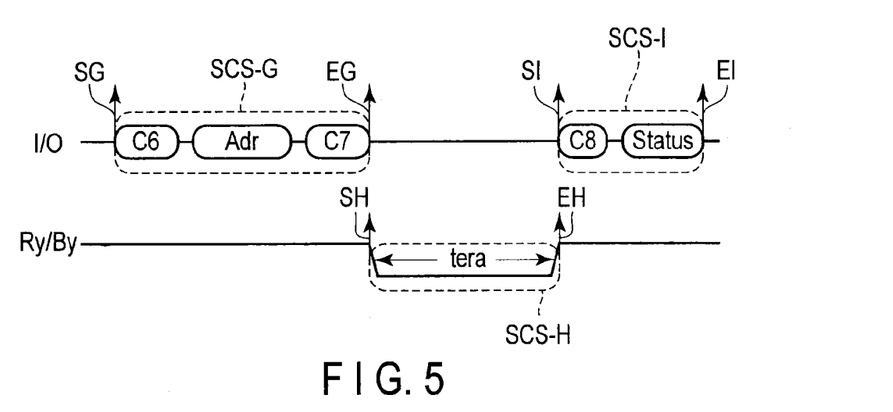

FIG. 5 shows an example of an erase command.

The erase command comprises a sequence of commands C6, Adr, C7, C8 and Status. This sequence is transferred between the controller and each of the banks through I/O. However, it should be noted that C6, C7 and C8 correspond to primitive commands as described above.

For example, an operation of a bank is determined by C6, C7 and C8. Adr corresponds to an address phase in which an address to be referred to in erasure is transferred to the bank. Status corresponds to a status phase in which status indicating success/failure of the erasure is transferred to the controller.

In this example, an erase command sequence is divided into three sub-command sequences SCS-G, SCS-H and SCS-I.

Sub-command sequence SCS-G comprises C6, Adr and C7. Sub-command sequence SCS-H corresponds to busy time tera in which an erase operation is performed in the bank. Sub-command sequence SCS-I comprises C8 and Status.

Sequence executing part 12-2 determines whether or not to execute a sub-command sequence from sub-command sequence generating part 12-1. That is, when a sequence execution condition is satisfied, sequence executing part 12-2 transfers the sub-command sequence to bank #0 or bank #1.

Registration part 12-3 stores data for use in determining whether the sequence execution condition is satisfied or not. Such data includes parameters such as temperature and peak current generated by execution of the sub-command sequence. The parameters such as temperature and peak current, which are determined for each of sub-command sequences, are subjected to numeric conversion in advance, and then stored in registration part 12-3.

Figure 6:
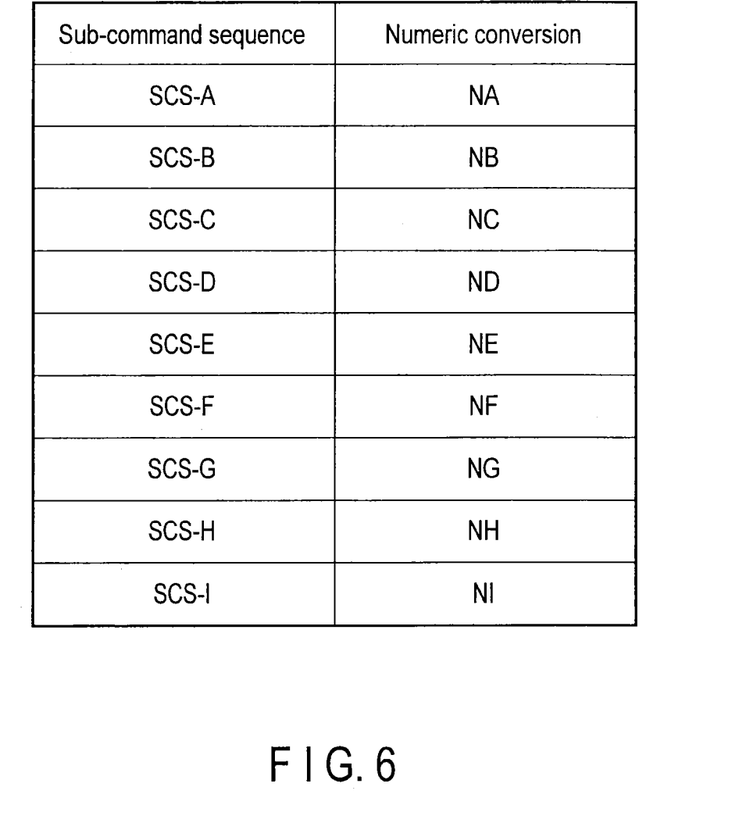
FIG. 6 is a view showing a first example of numeric conversion.

FIG. 6 shows a first example of numeric conversion.

FIG. 6 is a table indicating a relationship between sub-command sequences SCS-A, SCS-B, SCS-C, . . . SCS-I and parameters NA, NB, NC, . . . NI obtained by performing numeric conversion, such as temperature and peak current generated by executing the command sequences.

The table indicates that for example, when sub-command sequence SCS-A is executed, parameter NA is obtained in the system, and when sub-command sequence SCS-A, SCS-D and SCS-G are executed in parallel, the parameter "NA+ND+NG" is obtained in the system.

Furthermore, data based on which registration part 12-3 determines a sequence execution condition includes threshold data.

Bank access management part 12-4 determines whether a sub-command sequence satisfies the sequence execution condition or not. Bank access management part 12-4 compares a parameter obtained by numeric converting as shown in FIG. 6 (it compares, if a plurality of sub-commands are executed in parallel, a total value obtained by adding values) with threshold data, and determines that the sequence execution condition is satisfied if the parameter is smaller than the threshold data.

For example, in order to transfer a sub-command sequence, sequence executing part 12-2 provides an event signal indicating a start of the sequence to bank access management part 12-4. Upon receipt of the event signal, bank access management part 12-4 adds to a parameter of a sub-command sequence being executed at the time, a parameter of a subsequent sub-command sequence to be transferred.

When the total parameter obtained by the above addition is smaller than the threshold data, bank access management part 12-4 determines that the sequence execution condition is satisfied, and when the total parameter obtained by the addition is greater than the threshold data, bank access management part 12-4 determines that the sequence execution condition is not satisfied.

When determining that the sub-command sequence satisfies the sequence execution condition, bank access management part 12-4 permits an access to a bank. That is, sequence executing part 12-2 transfers the sub-command sequence to bank #0 or bank #1.

Furthermore, when sequence executing part 12-2 ends the sub-command sequence, an event signal indicating the end of the sequence is provided to bank access management part 12-4. Upon receipt of the event signal, bank access management part 12-4 subtracts a parameter of a sub-command sequence ended at the time from a parameter of a sub-command executed just before the time.

In FIGS. 3-5, SA, SB, SC, . . . SI denote event signals indicating starts of sub-command sequences SCS-A, SCS-B, SCS-C, . . . SCI, and EA, EB, EC, . . . EI denote event signals indicating ends of sub-command sequence SCS-A, SCS-B, SCS-C and SCS-I.

Progress management part 12-5 checks whether a sub-command sequence is executed by sequence executing part 12-2 or not to manage progress of the sub-command sequence. To be more specific, there is a case where timing at which the sub-command sequence is transferred to bank #0 or bank #1 varies in accordance with whether the sequence execution condition is satisfied or not. In view of the above, progress management part 12-5 manages progress of the sub-command sequence in real time, and provides data on the progress to sub-command sequence generating part 12-1. Sub-command sequence generating part 12-1 produces a new sub-command sequence based on the data on the progress.

First Embodiment

Figure 7:
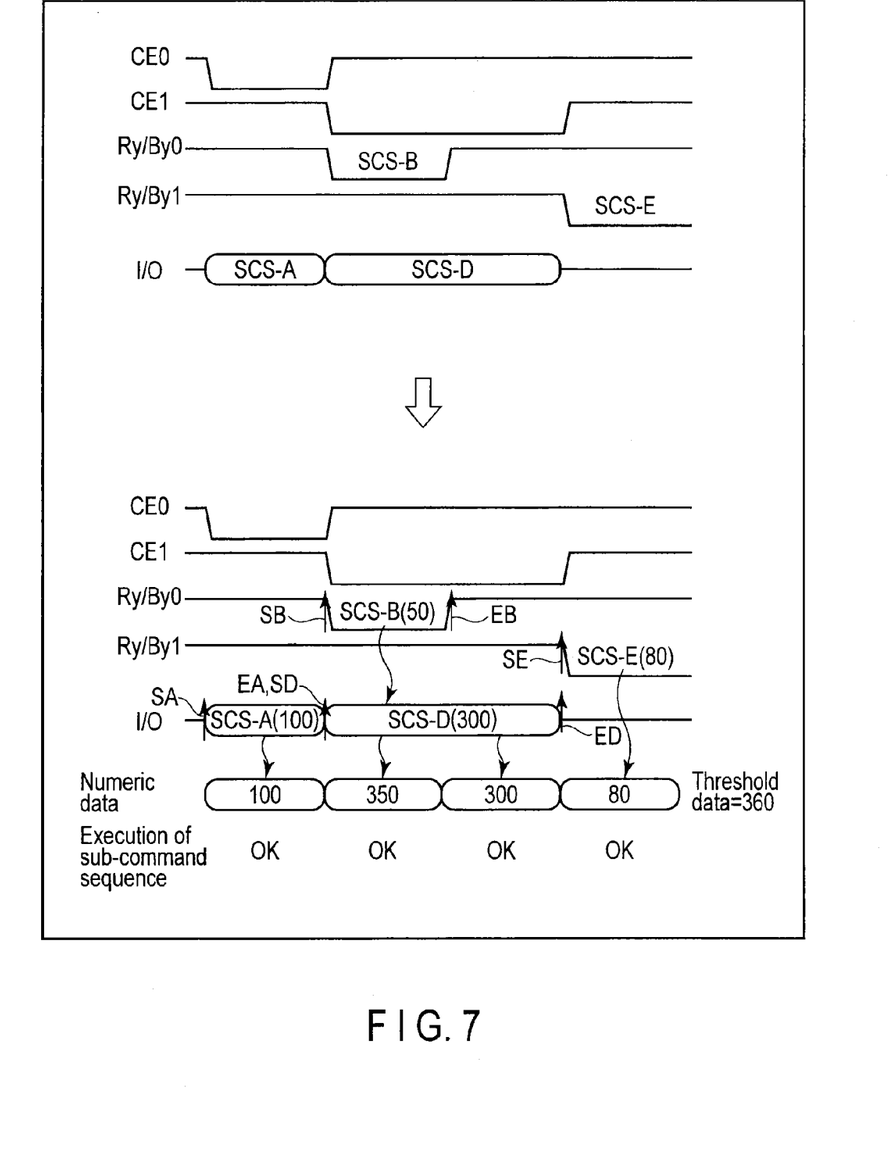
FIGS. 7 and 8 are views showing relationships between numeric conversion and whether executions of sub-command sequences are permitted or not.

FIG. 7 shows a relationship between numeric conversion and whether a sub-command sequence is executed or not.

The first embodiment will be explained by referring to an interleave operation in which a read operation on bank #0 and a write operation on bank #1 are performed in parallel.

For example, when chip enable signal CE0 changes to "L", sub-command sequence SCS-A is transferred to bank #0.

Then, bank #0 enters a busy state (sub-command sequence SCS-B) in which a read operation on bank #0 is performed.

Also, in the case where bank #0 is in the busy state, when chip enable signal CE1 changes to "L", sub-command sequence SCS-D is transferred to bank #1. Then, bank #0 enters a busy state (sub-command sequence SCS-E) in which a write operation is performed on bank #0.

Sub-command sequences SCS-A, SCS-B, SCS-D and SCS-E correspond to SCS-A, SCS-B, SCS-D and SCS-E, respectively, which are shown in FIGS. 3, 4 and 6.

In the first embodiment, the parameters of sub-command sequences are set as follows:

Parameter NA of sub-command sequence SCS-A is 100, parameter NB of sub-command sequence SCS-B is 50, parameter ND of sub-command sequence SCS-D is 300, and parameter NE of sub-command sequence SCS-E is 80. Furthermore, threshold data which is a condition set for transfer of a sub-command sequence is 360.

It should be noted that I/O denotes a sub-command sequence to be transferred between the controller and a bank.

In this case, a parameter at a point of time when event signal SA is supplied is 100, a parameter (total value obtained by adding values) at a point of time when event signals SB and SD are supplied is 350, and a parameter at a point of time when event signal SE is supplied is 80. These parameters are both smaller than the threshold data.

Therefore, at timings as indicated in a flowchart in lower part of FIG. 7, sub-command sequence SCS-A, SCS-B, SCS-D and SCS-E are permitted to be executed.

Figure 8:
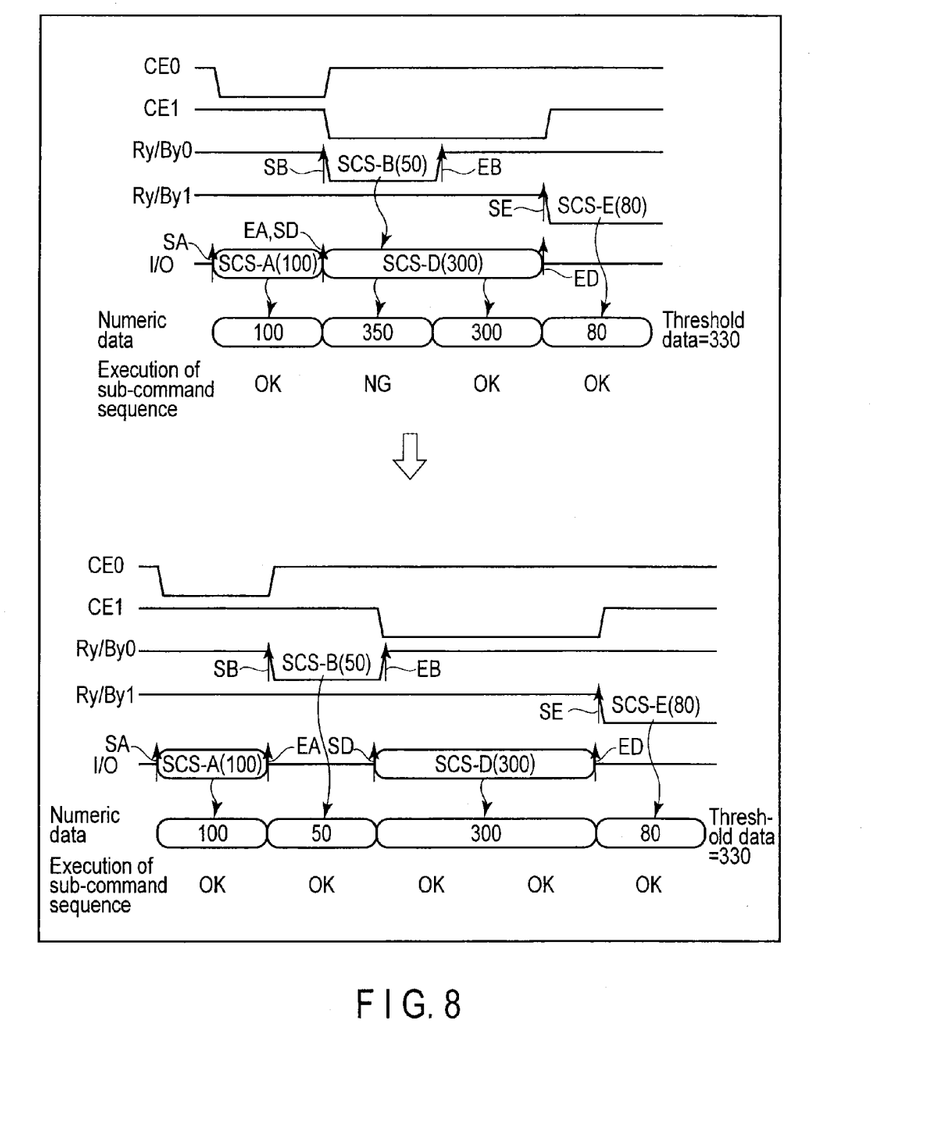

Next, an explanation will be given with respect to the case where only the threshold data is changed to 330 under the following conditions.

In this case, as shown in FIG. 8, a parameter (total value obtained by adding values) at the point in time when event signals SB and SD are supplied is 350. This parameter is greater than the threshold data.

Thus, for example, by delaying the time of transferring sub-command sequence SCS-D, a parameter at the point in time when event signal SB is supplied is set to 50, and that at the point in time when event signal SD is supplied is set to 300. Those parameters are both smaller than the threshold data.

Therefore, at the timings as shown in lower part of FIG. 8, executions of sub-command sequences SCS-A, SCS-B, SCS-D and SCS-E are permitted.

Second Embodiment

In the first embodiment, in the case where a sub-command sequence does not satisfy the sequence execution condition, transfer of the sub-command sequence is delayed.

On the other hand, the second embodiment proposes a technique for enabling a sub-command sequence to be executed in one of a plurality of modes differing in parameter from each other. In this case, if one of the plurality of modes is selected to satisfy a command execution condition, a sub-command sequence can be executed at timing of a predetermined interleave operation, without delaying the timing of transfer of the sub-command sequence.

Figure 9:
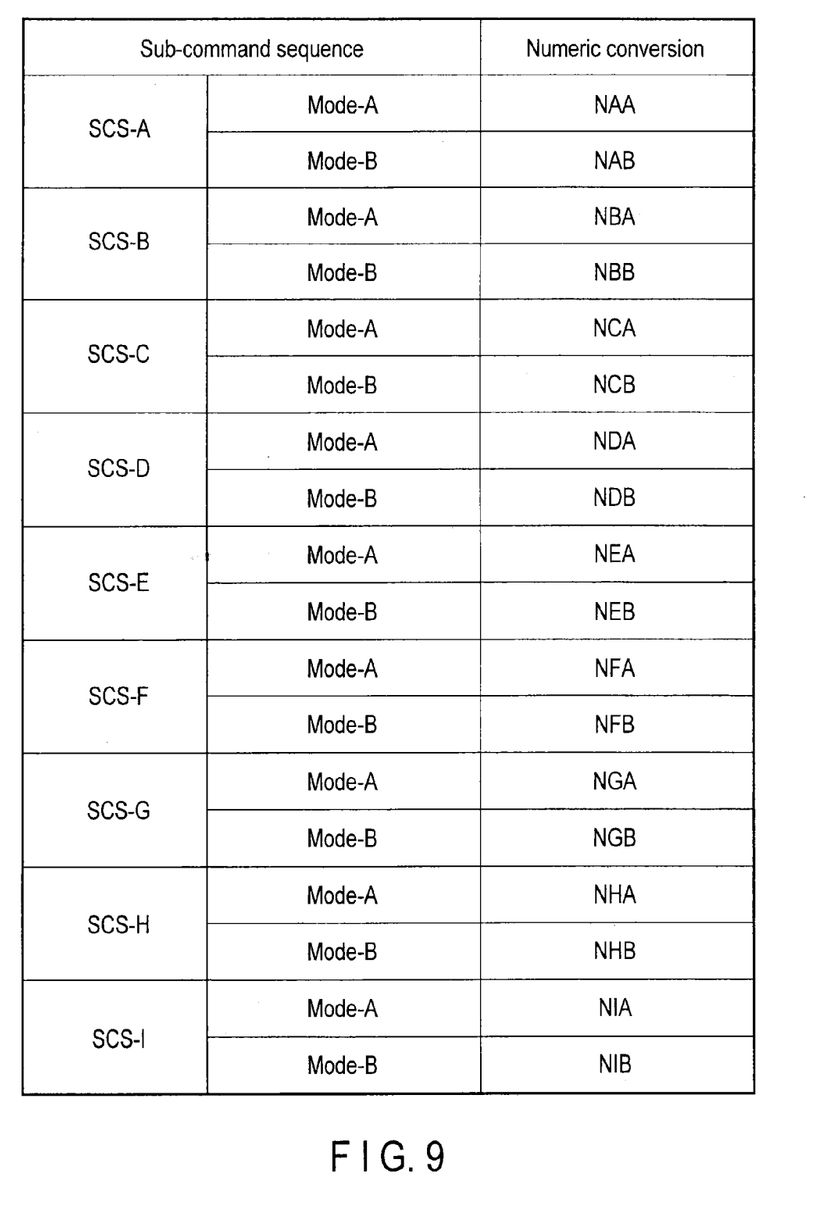
FIG. 9 shows a second example of numeric conversion.

FIG. 9 shows a second example of numeric conversion.

This figure is a table indicating a relationship between sub-command sequences SCS-A, SCS-B, . . . SCS-I and parameters NAA, NAB, NBA, NBB, . . . NIA and NIB obtained by numeric conversion, such as temperature and peak current generated by executing the sub-command sequences.

A feature of the table resides in that there are two modes for execution of each of sub-command sequences, unlike the first example (FIG. 6). In the second example, the number of modes for each sub-command sequence is two; however, it is not limited to two. That is, it suffices that the number of modes for each sub-command sequence is two or more.

The above table means that for example, when mode A of sub-command sequence SCS-A is applied, the parameter "NAA" in obtained in the system, and when mode A of sub-command sequence SCS-A and mode B of sub-command sequence SCS-D are applied in parallel, parameter "NAA+NDB" is obtained in the system.

Such a mode can be changed in accordance with a data transfer rate (data rate) of read data/write data in a read operation/write operation. For example, when the data rate of read data/write data is decreased, the value of a parameter, which is obtained by numeric conversion, such as temperature and peak current generated in the system, is also decreased; and when the data rate of the read data/write data is increased, the value of the parameter obtained by numeric conversion, such as the temperature and peak current generated in the system, is also increased.

Furthermore, in an erase operation, the above value can be varied in accordance with the number of blocks to be subjected to erasure. To be more specific, for example, when the number of blocks to be erased is decreased, the value of the parameter obtained by numeric conversion, such as the temperature and peak current generated in the system, is also decreased; and when the number of blocks to be erased is increased, the value of the parameter obtained by numeric conversion, such as the temperature and peak current generated in the system, is also increased.

Figure 10:
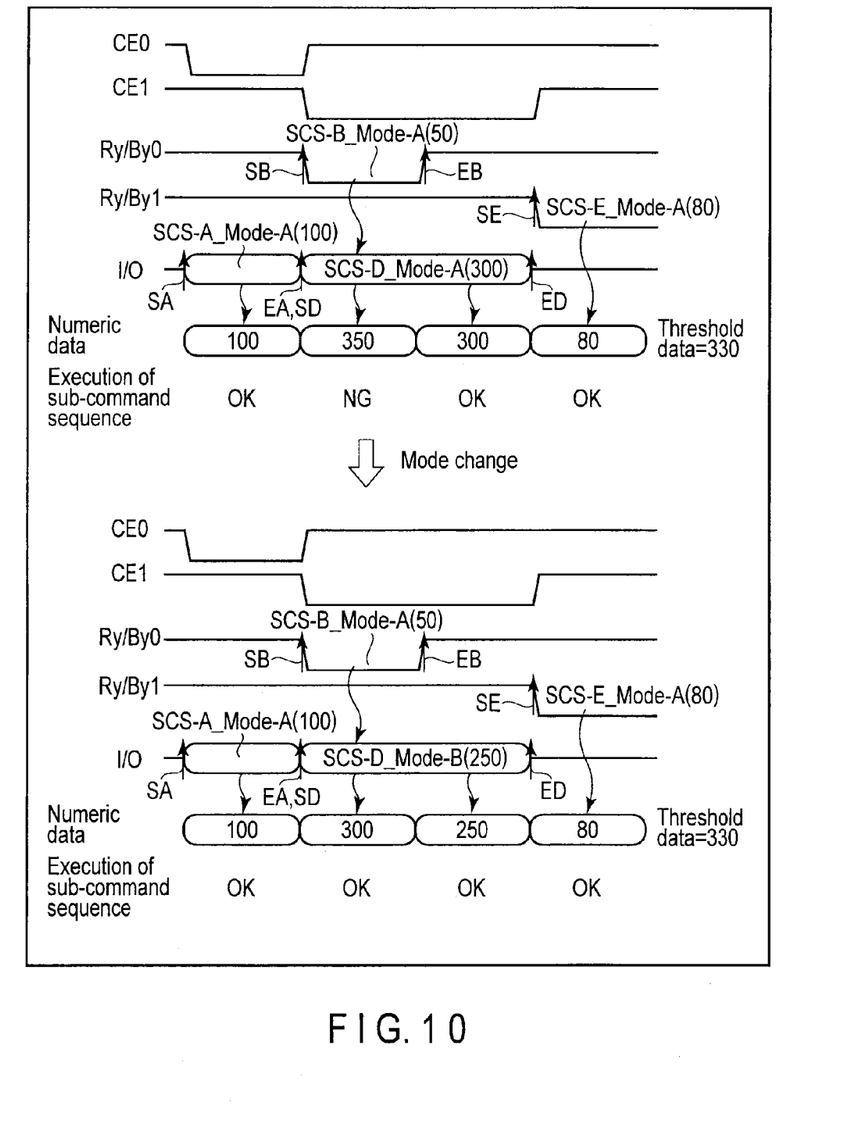
FIG. 10 are views showing a relationship between numeric conversion and whether executions of sub-command sequences are permitted or not.

FIG. 10 shows a relationship between numeric conversion and whether a sub-command sequence can be executed or not.

The above example will be explained by referring to an interleave operation in which a read operation on bank #0 and a write operation on bank #1 are performed in parallel.

For example, when chip enable signal CE0 is changed to "L", sub-command sequence SCS-A_Mode-A is transferred to bank #0. Then, bank #0 enters a busy state (sub-command sequence SCS-B_Mode-A) in which a read operation is performed on bank #0.

Furthermore, in the case where bank #0 is in the busy state, when chip enable signal CE1 is changed to "L", sub-command sequence SCS-D_Mode-A is transferred to bank #1. Then, bank #0 enters a busy state (sub-command sequence SCS-E_Mode-A) in which a write operation is performed on bank #0.

It should be noted that sub-command sequences SCS-A_Mode-A, SCS-B_Mode-A, SCS-D_Mode-A and SCS-E_Mode-A correspond to SCS-A_Mode-A, SCS-B_Mode-A, SCS-D_Mode-A and SCS-E_Mode-A as shown in FIG. 9.

In the above example, the parameters of sub-command sequences will be set as follows:

Parameter NAA of sub-command sequence SCS-A_Mode-A is 100; parameter NB of sub-command sequence SCS-BA_Mode-A is 50; parameter NDA of sub-command sequence SCS-D_Mode-A is 300; and parameter NEA of sub-command sequence SCS-E_Mode-A is 80. Furthermore, threshold data which is a condition for transfer of a sub-command sequence is 330.

It should be noted that I/O denotes a sub-command sequence to be transferred between the controller and banks.

In this case, a parameter at a point of time when event signal SA is supplied is 100; a parameter (a total value obtained by adding values) at a point of time when event signals SB and SD are supplied is 350; and a parameter at a point of time when event signal SE is supplied is 80.

Parameters at a point of time when event signals SA and SE are supplied are both smaller than the threshold data. However, parameters at a point of time when event signals SB and SD are supplied are greater than the threshold data.

In view of the above, in the second embodiment, sub-command sequence SCS-D_Mode-A is changed to sub-command sequence SCS-D_Mode-B. Parameter NDB of sub-command sequence SCS-D_Mode-B is, e.g., 250.

As a result, the parameter (total value obtained by adding values) at the point of time when event signal SB and SD are supplied is changed from 350 to 300; that is, it is changed to be smaller than the threshold data.

Therefore, at timings as shown in a flowchart in lower part of FIG. 10, sub-command sequence SCS-A_Mode-A, SCS-B_Mode-A, SCS-D_Mode-B and SCS-E_Mode-A are permitted to be executed.

Application Example

Figure 11:
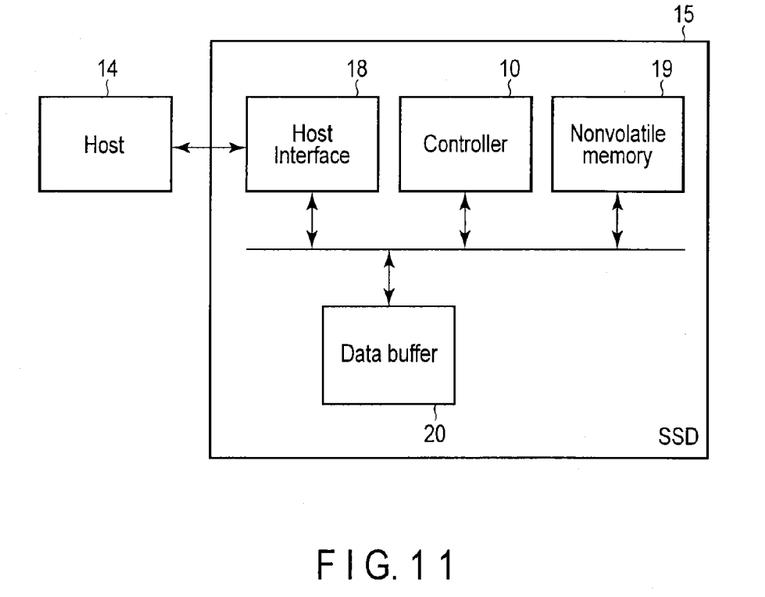
FIG. 11 is a view showing an SSD as an example of application.

FIG. 11 shows a SSD as an example of application.

SSD 15 comprises host interface 18, controller 10, nonvolatile memory 19 and data buffer 20. SSD 15 is connected to host 14, e.g., a personal computer, and a server. SSD 15 functions as, e.g., an external storage device for host 14. Host interface 18 functions as an interface between host 14 and SSD 15.

Nonvolatile memory 19 is, e.g., a NAND flash memory. Data buffer 20 is, e.g., a DRAM or a magnetic random access memory (MRAM). That is, it suffices that data buffer 20 is a random access memory whose speed is higher than that of nonvolatile memory 19 as a storage memory.

Controller 10 controls the interleave operation which is performed in the above first and second embodiments.

Figure 12:
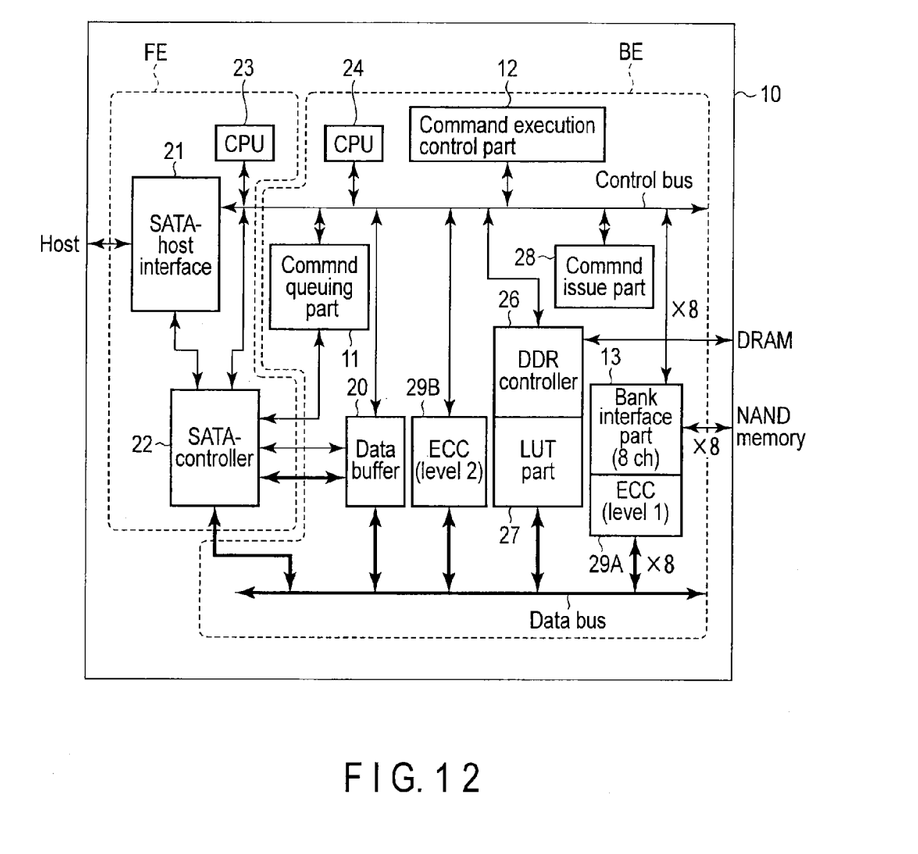
FIG. 12 shows an example of a controller as shown in FIG. 11.

FIG. 12 shows an example of controller 10 as shown in FIG. 11.

Controller 10 comprises front end part FE and back end part BE.

Front end part FE comprises front end CPU 23 which controls an operation in front end part FE, SATA host interface 21 serving as an interface for the host, and SATA controller 22 which controls data communication with back end part BE.

Back end part BE comprises: back end CPU 24 which controls an operation in back end part BE; command queuing part 11 which queues a plurality of commands; command execution control part 12 which controls execution of a command; data buffer (e.g., SRAM) 20 which temporarily stores data; command issue part 28 which issues a command; double data rate (DDR) controller 26 which controls a DRAM serving as an external memory; LUT part 27 which temporarily stores a look-up table read out from the DRAM; a bank interface part (NAND controller) 13 which controls a NAND memory; and ECC circuits 29A and 29B which correct data in the NAND memory.

Bank interface part 13 includes, e.g., 8 channels. In this case, bank interface part 13 can control 8 NAND memories such that they are controlled independently. The error correction function of ECC circuit (level 2) 29B is superior to that of ECC circuit (level 1) 29A. In accordance with the status of use of a NAND memory or memories, either ECC circuit 29A or 29B is properly used.

Figure 13:
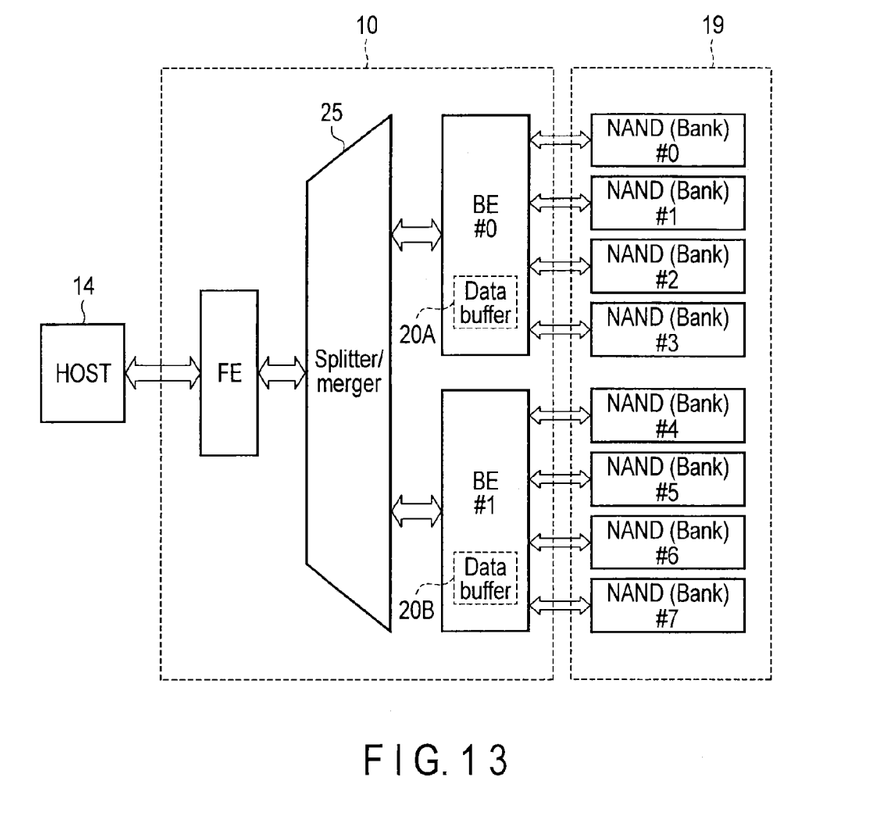
FIG. 13 is a view showing a relationship between a front end part and a back end part as shown in FIG. 12.

FIG. 13 shows a relationship between the front end part and the back end part.

Front end part FE and Back end part BE are connected to each other by splitter/merger 25. Splitter/merger 25 splits and mergers data to be transferred from host 14 to a memory device (e.g., a NAND device) or data to be transferred from the memory device to host 14.

Back end part BE comprises first back end BE#0 and second back end BE#1. First back end BE#0 comprises first data buffer 20A, and second back end BE#1 comprises second data buffer 20B.

First back end BE#0, for example, performs data communication (read/write) associated with a first command, through first data buffer 20A, and second back end BE#1, for example, performs data communication (read/write) associated with a second command, through second data buffer 20B.

In the application example, controller 10 comprises 8 channels NAND#0, NAND#1, NAND#2, NAND#3, NAND#4, NAND#5, NAND#6 and NAND#7. 4 channels NAND#0, NAND#1, NAND#2 and NAND#3 are connected to first back end BE#0, and 4 channels NAND#4, NAND#5, NAND#6 and NAND#7 are connected to second back end BE#1.

According to the above application example, the performance of the SSD can be improved due to improvement of the throughput in the memory system.

Conclusion

As described above, according to the embodiments and application example, the performance of the memory system can be improved by numeric conversion of parameters such as a temperature and peak current.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A controller comprising:
a first command queuing part corresponding to a first bank, the first command queuing part queuing a first command, the first bank executing the first command queued in the first command queuing part;
a second command queuing part corresponding to a second bank, the second command queuing part queuing a second command, the second bank executing the second command queued in the second command queuing part; and
a command execution control part which is configured to:
generate a first sub-command sequence based on a group of commands in the first command queued in the first command queuing part,
generate a second sub-command sequence based on a group of commands in the second command queued in the second command queuing part, and
determine whether or not to execute the first and second sub-command sequences in parallel as an interleave operation between the first and second banks, by comparing an additional value of a first numeric converted parameter of the first sub-command sequence and a second numeric converted parameter of the second sub-command sequence with a threshold data.

2. The controller of claim 1, wherein
the command execution control part is configured to:
generate the first sub-command sequence comprising at least two first sub-commands, the first sub-commands included in the group of commands in the first command queued in the first command queuing part, the first sub-commands being sequentially transferred, and
generate the second sub-command sequence comprising at least two second sub-commands, the second sub-commands included in the group of commands in the second command queued in the second command queuing part, the second sub-commands being sequentially transferred.

3. The controller of claim 1, wherein
the command execution control part is configured to:
add the first numeric converted parameter based on an event signal showing a start of the first sub-command sequence, and
add the second numeric converted parameter based on an event signal showing a start of the second sub-command sequence.

4. The controller of claim 1, wherein
the command execution control part is configured to:
subtract the first numeric converted parameter based on an event signal showing an end of the first sub-command sequence, and
subtract the second numeric converted parameter based on an event signal showing an end of the second sub-command sequence.

5. The controller of claim 1, wherein
the command execution control part is configured to:
execute the first and second sub-command sequences in parallel as the interleave operation, when the additional value is smaller than the threshold data.

6. The controller of claim 1, wherein
the command execution control part is configured to:
delay an execution of one of the first and second sub-command sequences, when the additional value is larger than the threshold data.

7. The controller of claim 1, wherein
the first sub-command sequence is executed by one of a first mode to which the first numeric converted parameter is applied and a second mode to which a third numeric converted parameter is applied.

8. The controller of claim 7, wherein
the command execution control part is configured to:
execute the first and second sub-command sequences in parallel as the interleave operation by changing from the first mode to the second mode, when the additional value is larger than the threshold data.

9. The controller of claim 1, wherein
the first numeric converted parameter includes an information on at least a peak current or a temperature, which is generated by executing the first sub-command sequence, and
the second numeric converted parameter includes an information on at least a peak current or a temperature, which is generated by executing the second sub-command sequence.

10. The controller of claim 1, wherein
each of the first and second commands is one of a read command, a write command and an erase command.

11. The controller of claim 1, wherein
the command execution control part comprises a sub-command sequence generating part which generates at least one sub-command sequence including the first sub-command sequence from the first command and which generates at least one sub-command sequence including the second sub-command sequence from the second command.

12. The controller of claim 1, wherein
the command execution control part comprises a sequence executing part which executes the first and second sub-command sequences in parallel as the interleave operation, when a sequence executing condition is complied with.

13. The controller of claim 12, wherein
the command execution control part comprises a registration part which stores the first and second numeric converted parameters and the threshold data to determine whether the sequence executing condition is complied with.

14. The controller of claim 13, wherein
the command execution control part comprises a bank access management part which determines whether or not to execute the first and second sub-command sequences in parallel as the interleave operation, by generating the additional value from the first and second numeric converted parameters and by comparing the additional value with the threshold data.

15. The controller of claim 11, wherein
the command execution control part comprises a progress management part which manages a progress of the first and second sub-command sequences and which reports the progress to the sub-command sequence generating part.

16. A solid-state drive comprising:
first and second banks; and
a controller which controls an interleave operation between the first and second banks,
the controller comprising:
a first command queuing part corresponding to a first bank, the first command queuing part queuing a first command, the first bank executing the first command queued in the first command queuing part;
a second command queuing part corresponding to a second bank, the second command queuing part queuing a second command, the second bank executing the second command queued in the second command queuing part; and
a command execution control part which is configured to:
generate a first sub-command sequence based on a group of commands in the first command queued in the first command queuing part,
generate a second sub-command sequence based on a group of commands in the second command queued in the second command queuing part, and
determine whether or not to execute the first and second sub-command sequences in parallel as the interleave operation, by comparing an additional value of a first numeric converted parameter of the first sub-command sequence and a second numeric converted parameter of the second sub-command sequence with a threshold data.

17. The solid-state drive of claim 16, wherein
the first numeric converted parameter includes an information on one of a peak current and a temperature, which is generated by executing the first sub-command sequence, and
the second numeric converted parameter includes an information of one of a peak current and a temperature, which is generated by executing the second sub-command sequence.

18. The solid-state drive of claim 16, wherein
each of the first and second commands is one of a read command, a write command and an erase command.

19. The solid-state drive of claim 16, wherein
each of the first and second banks is a NAND flash memory.

20. A control method comprising:
queuing a first command in a first command queuing part, the first command queuing part corresponding to a first bank which is capable of executing the first command queued in the first command queuing part;
queuing a second command in a second command queuing part, the second command queuing part corresponding to a second bank which is capable of executing the second command queued in the second command queuing part;
generating a first sub-command sequence based on a group of commands in the first command queued in the first command queuing part,
generating a second sub-command sequence based on a group of commands in the second command queued in the second command queuing part, and
determining whether or not to execute the first and second sub-command sequences in parallel as an interleave operation between the first and second banks, by comparing an additional value of a first numeric converted parameter of the first sub-command sequence and a second numeric converted parameter of the second sub-command sequence with a threshold data.

* * * * *